United States Patent [19]
Schmitt et al.

[11] Patent Number: 4,884,996
[45] Date of Patent: Dec. 5, 1989

[54] ELASTIC COUPLING WITH SPRING GUIDES

[75] Inventors: Manfred Schmitt; Wolfgang Hanke, both of Heidenheim, Fed. Rep. of Germany

[73] Assignee: J. M. Voith GmbH, Heidenheim, Fed. Rep. of Germany

[21] Appl. No.: 282,910

[22] Filed: Dec. 12, 1988

Related U.S. Application Data

[63] Continuation of Ser. No. 105,869, Oct. 7, 1989, abandoned.

[30] Foreign Application Priority Data

Oct. 15, 1986 [DE] Fed. Rep. of Germany ....... 3635043

[51] Int. Cl.$^4$ .............................................. F16D 3/12
[52] U.S. Cl. .................................... 464/68; 192/106.2; 464/66; 464/85
[58] Field of Search ................. 192/106.2; 464/66, 67, 464/68, 85

[56] References Cited

U.S. PATENT DOCUMENTS

| | | | |
|---|---|---|---|
| 1,510,943 | 10/1924 | Kjelsbergh | 464/66 |
| 2,251,128 | 7/1941 | Goodwin | 192/106.2 |
| 2,623,409 | 12/1952 | Herndon et al. | 464/68 X |
| 2,895,316 | 7/1959 | Kloud | 464/68 |
| 4,484,898 | 11/1984 | Kohno | 464/68 X |
| 4,499,981 | 2/1985 | Nagano | 464/68 X |
| 4,530,673 | 7/1985 | Lamarche | 464/68 X |

FOREIGN PATENT DOCUMENTS

| | | |
|---|---|---|
| 231825 | 2/1964 | Austria . |
| 2848748 | 5/1980 | Fed. Rep. of Germany . |
| 3315484 | 10/1984 | Fed. Rep. of Germany ........ 464/66 |
| 55-20930 | 2/1980 | Japan ................... 192/106.2 |

*Primary Examiner*—Daniel P. Stodola
*Attorney, Agent, or Firm*—Albert L. Jeffers; Richard L. Robinson

[57] ABSTRACT

An elastic coupling (1) of disc construction and of the kind in which two coupling halves (2, 3) rotationally interlock and have helical compression springs (5) tangentially arranged in ports (4) in the coupling halves, which transmit torque from one coupling half to the other. So as to avoid the springs curving outwards at high rotational speed and/or with a low loading, under the effect of centrifugal force, sliding members (10) are loosely inserted into the ports. The sliding member can either be constructed with a concave groove (11) which partially surrounds the spring from outside and is disposed between the coils of the spring and its respective ports, or in the shape of a bar (10a) which is loosely inserted coaxially into the spring. The springs (5), on their sides turned towards the axis of rotation, are prevented from being overstressed by high end pressure and also wear connected with excessive curvature caused by increased end pressure, and also reduce the danger of the springs jumping out of their centering. A further advantage is that the oscillation and damping behaviour of the coupling remain unchanged.

4 Claims, 2 Drawing Sheets

4,884,996

ELASTIC COUPLING WITH SPRING GUIDES

This is a continuation of application Ser. No. 105,869, filed Oct. 7, 1987, now abandoned.

The invention relates to an elastic coupling of disc construction and of the kind in which the coupling halves rotationally interlock and have ports distributed around their circumference in which tangentially disposed helical compression springs are accommodated. Such a coupling is known from German Patent Specification No. 28 48 748.

Torque is introduced from one of the coupling halves which, for example, may be fixed to the flywheel of a driving motor, to respective ends of the tangentially disposed springs and transmitted from the other ends of the springs to the other coupling half. The ends of the springs are generally supported, or guided, in suitable components for centering within the ports provided in the coupling halves. The elasticity and the oscillation, or damping behaviour, of the coupling can be influenced by the appropriate dimensioning of the springs, which are compressed together under the effect of the torque.

Couplings of the kind discussed above have proved to be successful in practice. However, under certain operating conditions, it has been observed that the springs are overstressed in their areas turned towards the coupling center and at the fixing points. Furthermore, increased wear is noted and also a change in the elastic properties of the coupling.

Furthermore, from German Laid-open Patent Specification No. (DE-OS) 33 15 484, is known an oscillation damper in which so-called friction segments are inserted into the ports of the discs. There these friction discs primarily serve the purpose of producing a damping of the friction between the two coupling halves. Moreover, they have the task of guiding the torsion springs in the radial direction, as a result of which there is supposed to be achieved soundproofing and less wear, whilst simultaneously avoiding frictional corrosion. The bearing surface of the individual friction segments for supporting the coils of the spring on their periphery is curved in the same way as the port itself. The individual friction segments are inserted, like a frame, into the port and fixed in relation to the springs.

Moreover, from U.S. Pat. Specification No. 2,251,128 is known a coupling, the springs of which are guided by a type of collar. These apparently serve the purpose of supporting the springs and affording protection against them jumping out of the mounting on the front side.

From Austrian Patent Specification (AT-PS) No. 231 825 is known a coupling, the springs of which are equipped with a connecting pin centrally penetrating the springs. This in is clamped fast on both sides in the recess in the respective coupling half and is to prevent its spring falling out. Moreover, at the same time parts of the springs, eg after a spring breaks, are prevented from being lost and causing subsequent damage.

The object of the invention is to provide an arrangement of elastic coupling in which the springs are subject neither to overstressing nor to increased wear, and which avoids any alteration in the elastic properties of the coupling.

Thus, the inventors have recognised that the cause of overloading and wear of the coupling springs lies in the fact that these have to be designed relatively long so as to obtain a special elastic property and in that they curve outwards under the effect of centrifugal force when the rotational speed is high and the torque is small, ie when the spring is only slightly compressed. Apparently, the cause of overstressing, increased wear and an alteration in the elastic properties is to be found herein as a result of end pressure an d faulty power input. In accordance with the invention, the curvature of the springs towards the outside under the effect of centrifugal force is prevented by a sliding member which is inserted loosely in the port so as to hold the spring straight. The sliding member can be located in the gap between the outer side of the spring and the radially outer abutment surface of its respective ports in the coupling halves and have a concave curvature in the contact zone between it and its spring 5 adapted to the diameter of said spring.

The sliding member can be constructed in the shape of a bar and be inserted loosely into its respective spring, coaxially therewith. As a result, the spring retains its rectilinear shape and its property, even at high rotational speed, without any local overstressing or any interruption in the torque pick-up.

The friction segments according to DE-OS No. 33 15 484, on the other hand, permit a buckling of the springs, and the springs according to U.S. Pat. No. 2 251 128 are also subject to deformation in the sense of a radial curvature despite the collars surrounding them. Furthermore, the connecting pin according to AT-PS No. 231 825 is not able to prevent any buckling caused by centrifugal force and overstressing.

In accordance with advantageous refinements for the sliding member, the sliding member can have plane surfaces for lateral guidance inside lateral abutment walls of the coupling and the sliding member can be of a preferred material.

An exemplified embodiment of the invention will now be explained in more detail by reference to the drawings, in which.

Figure 1:
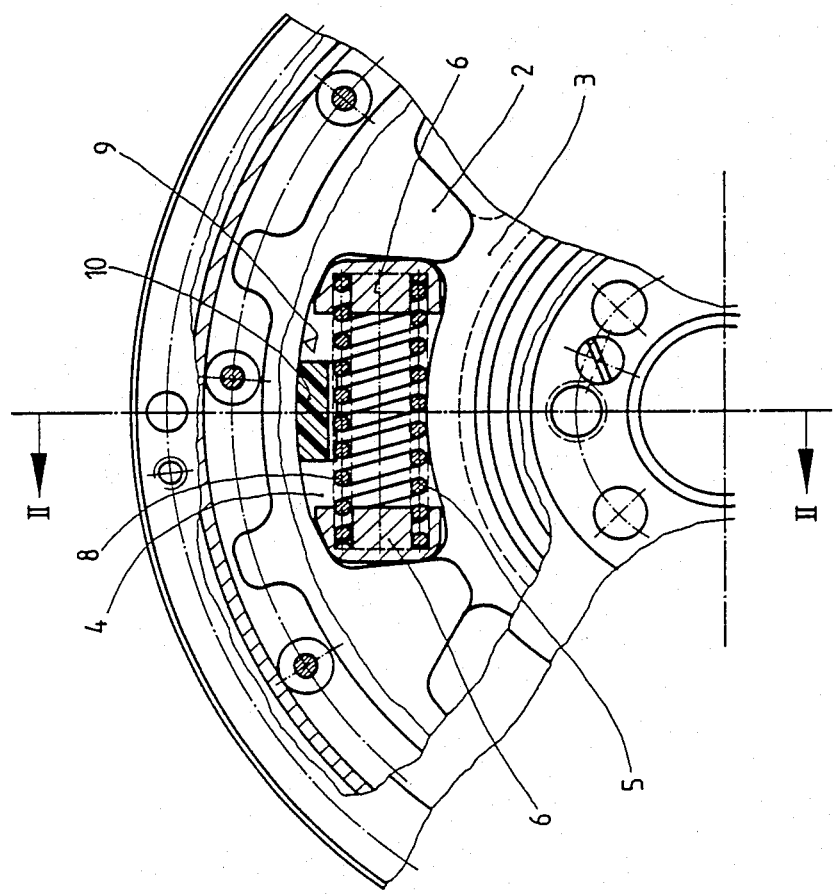
FIG. 1 is a partially sectional plan view of the coupling.

The coupling 1 shown in FIG. 1 consists of coupling halves 2 and 3 disposed coaxially one within the other. One coupling half 2 is connected to a driving motor (not shown) and itself consists of two side discs 2a and 2b, which form the lateral boundary of the coupling. The other coupling half 3 is connected, for example, with a vehicle drive (not shown). Both coupling halves 2 and 3 have several window-shaped ports 4, into which, as known per se tangentially arranged helical compression springs 5 having centering devices 6 at their ends 7 are inserted. Both coupling halves 2 and 3 act on both sides tangentially on these centering devices 6, so that, under the effect of the toque, compression of the helical compression springs 5 occurs in both rotational directions of the coupling 1.

Into the gap between the outer surfaces of the coils 8 of the spring 5 and the radially outer abutment surface 9 of its port 4 is inserted a sliding member 10. This prevents the spring 5 curving outwards under the effect of centrifugal force at high rotational speed and, if necessary, with a low load, ie when the spring is weakly compressed, which could otherwise cause the spring to slip out from the centering devices 6 and/or be overstressed at some locations. The sliding member 10 can be freely moved in the longitudinal direction of the spring on the coils 8 of the spring 5 so that, when the spring is compressed, it does not represent an obstacle, but can assume any appropriate position. The length of the sliding member 10 is chosen accordingly.

Figure 2:
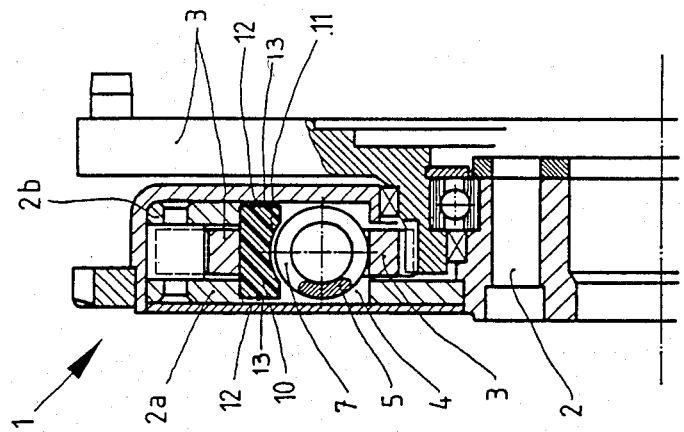
FIG. 2 is a transverse section through the coupling along intersection line II—II in FIG. 1.

The guidance of the sliding member 10 can be seen in Figure 2. The sliding member 10 has a concave groove 11 extending in its sliding direction in the area of contact with the spring 5, so that said spring can locate exactly on to the sliding member 10. The radially outer guidance of the sliding member 10 occurs on the inwardly facing abutment surface 9 of the outer region of the port 4. The inner abutment lateral surfaces 12 of the coupling half 2 serve for lateral guidance of the sliding member 10. For this purpose the sliding member 10 is also provided with plane lateral bearing surfaces 13.

Figure 3:
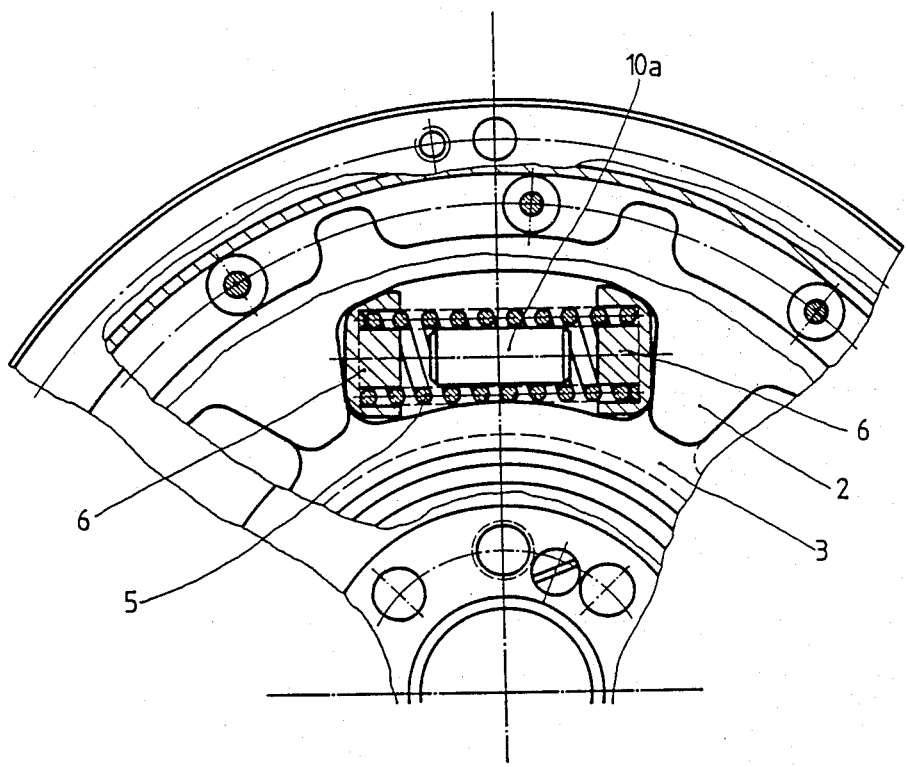
FIG. 3 is a longitudinal section through a spring with a bar-shaped sliding member.

FIG. 3 shows another embodiment of a sliding member 10a, which is constructed in the shape of a bar and is inserted loosely, coaxially into the bore of the spring 5.

The external diameter of the sliding member 10a roughly corresponds to the internal diameter of the spring 5 so as to ensure a secure support in its extended position. The sliding member 10a can either have a circular cross-section or, as per se known, a polygonal cross-section and/or be constructed as a tube to reduce weight. The length of the sliding member 10a is either designed so that, with the maximum torsion angle, there still does not occur any contiguity of the front side to the centering devices 6. However, provision can also be made to use the loosely inserted sliding members 10a as stops for limiting the torsion angle, so that it is not necessary to have a separate end stop.

In general, such a coupling is designed to be fluid-tight and, in operation it is filled with a suitable lubricant and damping medium. The reliable functioning of the sliding member is ensured in this way. A particularly suitable material for the sliding member 10, 10a is material which is also sufficiently strong even at high temperatures and has good antrifriction properties and resistance to the damping medium, ie plastics.

When a suitable material is chosen for the sliding member 10, 10a, the invention can also be used in couplings in which springs are not inserted into a housing filled with fluid.

I claim:

1. An elastic coupling having disc-shaped coupling halves which rotationally interlock and having ports in which tangentially disposed helical compression springs are accommodated, each port having a radially outer abutment surface and each spring having a radially outer peripheral region, and means including a sliding member loosely inserted in each port for keeping the respective spring straight, the sliding member being disposed between the radially outer peripheral region of the spring and the radially outer abutment surface of the port, the sliding member being freely displaceable on the radially outer peripheral region of the spring along the abutment surface, the sliding member being guided by a concave curvature in engagement with a respective spring, said curvature conforming to the diameter of the spring, and by the radially outer abutment surface of the respective ports in the coupling halves.

2. An elastic coupling according to claim 1, and further including lateral abutment walls, the sliding member having plane surfaces for lateral guidance between the lateral abutment walls.

3. An elastic coupling according to claim 2, in which the sliding member is composed of a plastic material.

4. An elastic coupling according to claim 1, in which the sliding member is composed of a plastics material.

* * * * *